(12) United States Patent
Seo

(10) Patent No.: US 12,505,886 B2
(45) Date of Patent: Dec. 23, 2025

(54) MEMORY DEVICE AND METHOD OF OPERATING THE MEMORY DEVICE

(71) Applicant: SK hynix Inc., Icheon-si (KR)

(72) Inventor: Moon Sik Seo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 150 days.

(21) Appl. No.: 18/489,394

(22) Filed: Oct. 18, 2023

(65) Prior Publication Data

US 2024/0379167 A1 Nov. 14, 2024

(30) Foreign Application Priority Data

May 11, 2023 (KR) .................. 10-2023-0061006

(51) Int. Cl.
*G11C 16/14* (2006.01)
*G11C 16/04* (2006.01)
*G11C 16/08* (2006.01)
*G11C 16/24* (2006.01)
*G11C 16/32* (2006.01)
*G11C 5/02* (2006.01)

(52) U.S. Cl.
CPC .......... *G11C 16/14* (2013.01); *G11C 16/0483* (2013.01); *G11C 16/08* (2013.01); *G11C 16/24* (2013.01); *G11C 16/32* (2013.01); *G11C 5/025* (2013.01)

(58) Field of Classification Search
CPC ..................................................... G11C 5/025
See application file for complete search history.

(56) References Cited

U.S. PATENT DOCUMENTS 11,188,268 B1 * 11/2021 Sharon ................... G11C 5/025

FOREIGN PATENT DOCUMENTS

| KR | 1020090007861 A | 1/2009 |
|----|---|---|
| KR | 102200493 B1 | 1/2021 |
| KR | 102291309 B1 | 8/2021 |

* cited by examiner

*Primary Examiner* — Jason Lappas
(74) *Attorney, Agent, or Firm* — WILLIAM PARK AND ASSOCIATES LTD.

(57) ABSTRACT

A method of operating a memory device includes applying a first erase voltage to a source line in an erase operation of a memory block connected between the source line and bit lines. The method also includes decreasing a voltage of the source line to which the first erase voltage is applied to a second erase voltage and then increasing a voltage of the source line to which the second erase voltage is applied to a third erase voltage. The magnitude of the second erase voltage is between the magnitudes of the first and third erase voltages.

20 Claims, 12 Drawing Sheets

MEMORY DEVICE AND METHOD OF OPERATING THE MEMORY DEVICE

CROSS-REFERENCE TO RELATED APPLICATION

The present application claims priority under 35 U.S.C. § 119(a) to Korean patent application number 10-2023-0061006 filed on May 11, 2023, in the Korean Intellectual Property Office, the entire disclosure of which is incorporated by reference herein.

BACKGROUND

1. Technical Field

The present disclosure generally relates to a memory device and a method of operating the memory device. More particularly, the present disclosure relates to a memory device configured to perform an erase operation and to a method of operating the memory device.

2. Related Art

A memory device may include a memory cell array in which data is stored, a peripheral circuit configured to perform program, read and erase operations and a control circuit configured to control the peripheral circuit.

The memory cell array may include a plurality of memory blocks. Each memory block of the plurality of memory blocks may include a plurality of memory cells.

A memory device having a three-dimensional structure may include memory cells stacked on a substrate. For example, the memory device having the three-dimensional structure may include plugs perpendicular to the substrate. The plugs may include select transistors connected between bit lines and a source line and memory cells connected between the select transistors. The memory cells and the select transistors between the bit lines and the source line may constitute strings.

The memory cells may have a program state or an erase state according to a threshold voltage. For example, memory cells having a threshold voltage higher than a reference voltage may have the program state, and memory cells having a threshold voltage lower than the reference voltage may have the erase state.

A program operation is an operation of increasing a threshold voltage of memory cells in the erase state to a threshold voltage corresponding to the program state. Since the memory cells have different electrical characteristics, levels of the threshold voltage may be different from each other even when the same program voltage is applied to the memory cells in the program operation. Therefore, the memory cells may have a threshold voltage distribution. That the threshold voltage of the memory cells forms a distribution means that the threshold voltage varies for every memory cell. This is because the threshold voltage of the memory cells becomes high or low at different speeds. That is, when two memory cells are compared with each other, with respect to a speed at which a threshold voltage of any one memory cells is changed, a memory cell of which threshold voltage is changed slower than the threshold voltage of the corresponding memory cell is referred to as a slow cell, and a memory cell of which threshold voltage is changed faster than the threshold voltage of the corresponding memory cell is referred to as a fast cell. Accordingly, among programmed memory cells, slow cells have a relatively low threshold voltage in the threshold voltage distribution, and fast cells have a relatively high threshold voltage in the threshold voltage distribution. As for erased memory cells, slow cells have a relatively high threshold voltage in the threshold voltage distribution, and fast cells have a relatively low threshold voltage in the threshold voltage distribution. Therefore, in the program operation of an erased memory block, as a difference between threshold voltages of slow cells and fast cells, which are included in the erased memory block, becomes larger, a program operation time of the memory block may increase.

SUMMARY

Embodiments provide a memory device capable of narrowing a threshold voltage distribution width of memory cells in an erase operation of the memory cells, and an operating method of the memory device.

In accordance with an aspect of the present disclosure, there is provided a method of operating a memory device, the method including: applying a first erase voltage to a source line in an erase operation of a memory block, the memory block being connected between the source line and bit lines, the first erase voltage having a first magnitude and applied to the source line for a first period of time; at the conclusion of the first period of time, applying a second erase voltage to the source line, the second erase voltage having a second magnitude less than the first magnitude and applied to the source line for a second period of time; at the conclusion of the second period of time, applying a third erase voltage to the source line, for a third period of time.

In accordance with another aspect of the present disclosure, there is provided a method of operating a memory device, the method including: during a first time period, decreasing threshold voltages of slow cells and fast cells, which are included in a selected memory block; during a second time period, which starts at the conclusion of the first time period, reducing a threshold voltage difference between the slow cells and the fast cells after the first phase; and during a third time period, which starts at the conclusion of the second time period, decreasing the threshold voltages of the slow cells and the fast cells after the second phase.

In accordance with still another aspect of the present disclosure, there is provided a memory device including: a period manager configured to sequentially output time information on: a) an erase voltage rising period, b) an erase period comprising a plurality of sub-periods, and c) a discharge period, in response to an erase command; a voltage level manager configured to output an operation code in response to the time information; and a voltage generator configured to sequentially output erase voltages having different levels in response to the operation code, wherein, in an erase operation, the voltage generator is configured to sequentially output a first erase voltage, output a second erase voltage lower than the first erase voltage, and output a third erase voltage higher than the second erase voltage, all of them being output in response to the operation code.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional descriptions disclosed herein are merely illustrative for the purpose of describing embodiments according to the concept of the present disclosure. Additional embodiments according to the concept of the present disclosure can be implemented in various forms. Thus, the present disclosure should not be construed as limited to the embodiments set forth herein.

Hereinafter, it will be understood that, although the terms "first," "second," etc. may be used herein to describe various elements, these elements should not be limited by these terms. These terms are only used to distinguish one element from another element.

Figure 1:
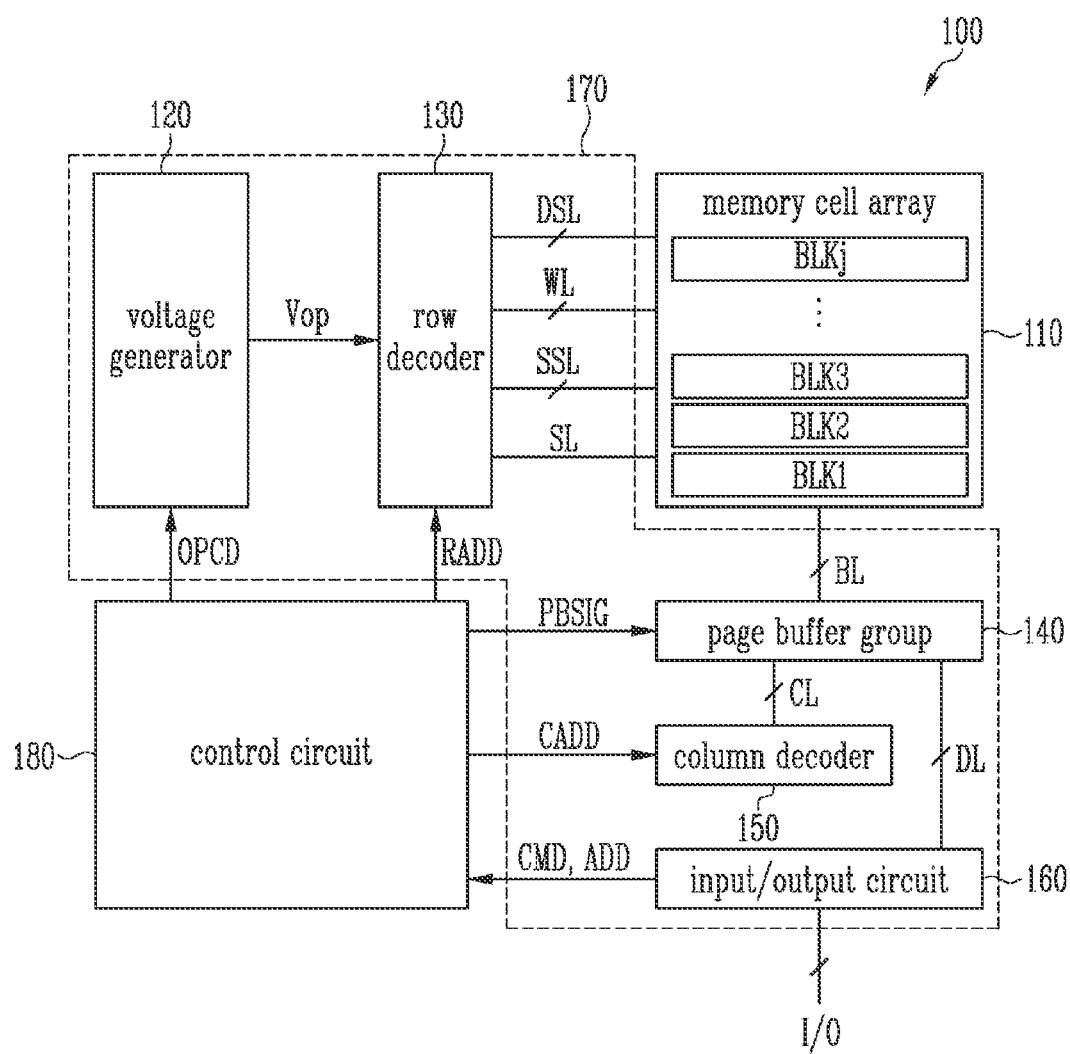
FIG. 1 is a diagram illustrating a memory device.

FIG. 1 is a diagram illustrating a memory device.

Referring to FIG. 1, the memory device 100 may include a memory cell array 110, a peripheral circuit 170, and a control circuit 180.

The memory cell array 110 may include first to jth memory blocks BLK1 to BLKj. Each of the first to jth memory blocks BLK1 to BLKj may include memory cells (not shown in FIG. 1), capable of storing data. Drain select lines DSL, word lines WL, source select lines SSL, and a source line SL may be connected to each of the first to jth memory blocks BLK1 to BLKj, and bit lines BL may be commonly connected to the first to jth memory blocks BLK1 to BLKj. The first to jth memory blocks BLK1 to BLKj may be formed in a three-dimensional structure. The memory blocks having the three-dimensional structure may include memory cells stacked on a substrate, not shown in FIG. 1.

The memory cells may store one-bit or two-or-more-bit data according to a program method. For example, a method in which one-bit data is stored in one memory cell is referred to as a single level cell (SLC) method, and a method in which two-bit data is stored in one memory cells is referred to as a multi-level cell (MLC) method. A method in which three-bit data is stored in one memory cell is referred to as a triple level cell (TLC) method, and a method in which four-bit data is stored in one memory cell is referred to as a quad level cell (QLC) method. In addition, five-or-more-bit data may be stored in one memory cell.

The peripheral circuit 170 may be configured to perform a program operation for storing data, a read operation for outputting data stored in the memory cell array 110, and an erase operation for erasing data stored in the memory cell array 110. To accomplish those operations, the peripheral circuit 170 may include a voltage generator 120, a row decoder 130, a page buffer group 140, a column decoder 150, and an input/output circuit 160.

The voltage generator 120 may generate various operating voltages Vop used for a program operation, a read operation, or an erase operation in response to an operation code OPCD. For example, the voltage generator 120 is configured to generate program voltages, turn-on voltages, turn-off voltages, negative voltages, a precharge voltage, verify voltages, read voltages, pass voltages, and erase voltages in response to the operation code OPCD. The operating voltages Vop generated by the voltage generator 120 may be applied to drain select lines DSL, word lines WL, source select lines SSL, and a source line SL of a selected memory block through the row decoder 130.

As used herein, a field effect transistor FET is considered "turned on" if the FET's channel is not in a "pinch off" state. Similarly, a FET is considered "turned off" if the FET's channel is in its pinch off state.

In FIG. 1, the program voltages are voltages applied to a selected word line among word lines WL in a program operation, and may be used to increase a threshold voltage of memory cells connected to the selected word line. Field effect transistor (FET) turn-on voltages may be applied to the drain select lines DSL or the source select lines SSL, and be used to "turn on" drain select transistors or source select transistors. The turn-off voltages may be applied to the drain select lines DSL or the source select lines SSL, and be used to turn off the drain select transistors or the source select transistors. For example, the turn-off voltage may be set to 0V.

A precharge voltage may be applied to the source line SL, and be used to increase a channel voltage of unselected strings in a soft program operation or a normal program operation. The negative voltages may be set to voltages lower than 0V. The verify voltages may be used in a verify operation for deciding whether a threshold voltage of selected memory cells has been increased or decreased to a target level. The verify voltages may be set to various levels according to the target level, and be applied to a selected word line. The read voltages may be applied to a selected word line in a read operation of selected memory cells. The pass voltages are voltages applied to unselected word lines in a program or read operation, and may be used to turn on memory cells connected to the unselected word lines. The erase voltages may be used in an erase operation for erasing memory cells included in a selected memory block, and be applied to the source line SL.

The voltage generator 120 may adjust levels of voltages applied to the drain select lines DSL, the word lines WL, the source select lines SSL, and the source line SL and it may adjust the times at which the aforementioned voltages are output from the voltage generator 120 in response to the operation code OPCD. The voltage generator 120 may also discharge lines to which the operating voltages Vop are applied, and it may adjust times at which the lines are discharged. The voltage generator 120 may also "float" selected lines.

The row decoder 130 may be configured to transmit the operating voltages Vop to drain select lines DSL, word lines WL, source select lines SSL, and a source line SL, which are connected to a selected memory block, according to a row address RADD. For example, the row decoder 130 may be connected to the voltage generator 120 through global lines, and may be connected to the first to jth memory blocks BLK1 to BLKj through the drain select lines DSL, the word lines WL, the source select lines SSL, and the source line SL.

The page buffer group 140 may include page buffers (not shown) connected to each of the first to jth memory blocks BLK1 to BLKj through the bit lines BL. In a program operation, program data transferred from the input/output circuit 160 may be stored in the page buffer group 140. The page buffer group 140 may apply a program allow voltage or a program inhibit voltage to the bit lines BL according to the program data in response to page buffer control signals PBSIG. In a verify operation, the page buffer group 140 may sense a current or a voltage of the bit lines BL, which varies according to threshold voltages of selected memory cells, and store sensed data.

The column decoder 150 may be configured to transmit data between the page buffer group 140 and the input/output circuit 160 in response to a column address CADD. For example, the column decoder 150 may be connected to the page buffer group 140 through column lines CL, and transmit enable signals through the column lines. The page buffers (not shown) in the page buffer group 140 may receive or send data through data lines DL in response to the enable signals.

The input/output circuit 160 may be configured to receive or send a command CMD, an address ADD, or data through input/output lines I/O. For example, the input/output circuit 160 may transmit to the control circuit 180, a command CMD and an address ADD, which are received at the input/output circuit 160 from an external controller (not shown) through the input/output lines I/O, and transmit data received from the external controller through the input/output lines I/O to the page buffer group 140. Alternatively, the input/output circuit 160 may send or output data transferred from the page buffer group 140 to the external controller through the input/output lines I/O.

The control circuit 180 may output an operation code OPCD, the row address RADD, the page buffer control signals PBSIG, and the column address CADD in response to the command CMD and the address ADD. For example, when the command CMD input to the control circuit 180 is a command corresponding to a program operation, the control circuit 180 may control the peripheral circuit 170 to perform a program operation of a memory block selected by the address ADD. When the command CMD input to the control circuit 180 is a command corresponding to a read operation, the control circuit 180 may control the peripheral circuit 170 to perform the read operation of the selected memory block and output read data. When the command CMD input to the control circuit 180 is a command corresponding to an erase operation, the control circuit 180 may control the peripheral circuit 170 to perform the erase operation of the selected memory block.

In the erase operation in accordance with this embodiment, the control circuit 180 may divide a period in which an erase voltage is applied to the source line SL or the bit lines BL into a plurality of periods, and control the peripheral circuit 170 such that different erase voltages are applied to the source line SL or the bit lines BL in the respective plurality of periods.

Figure 2:
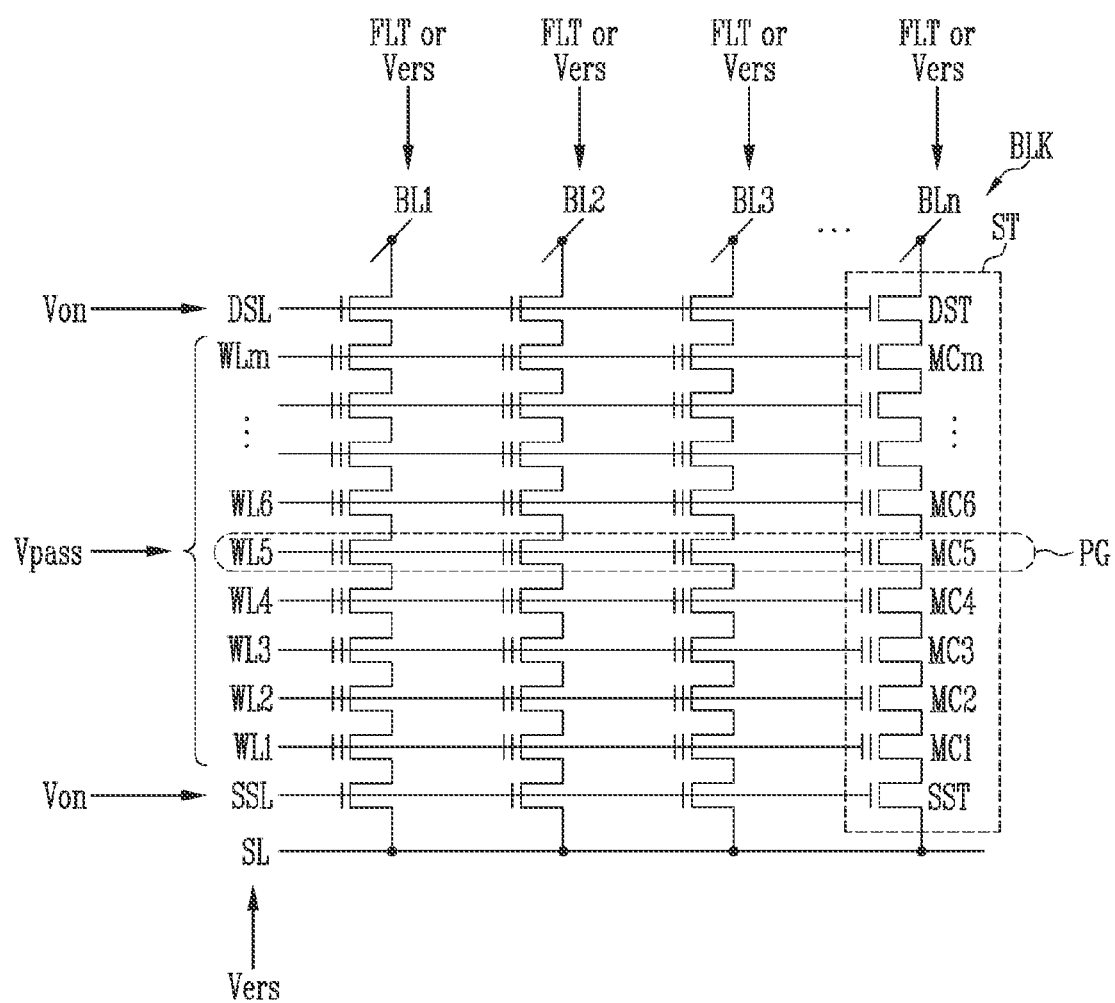
FIG. 2 is a circuit diagram illustrating a memory block.

FIG. 2 is a circuit diagram illustrating a memory block.

Referring to FIG. 2, the memory block BLK may be any one of the first to jth memory blocks BLK1 to BLKj shown in FIG. 1. The memory block BLK may include strings ST, each string ST being connected between one of the first to nth bit lines BL1 to BLn and a source line SL. A structure of a string ST connected between the nth bit line BLn and the source line SL will be described as an example as follows.

Each string ST may include a source select transistor SST, memory cells MC1 to MCm, and a drain select transistor DST, all of which are connected in series to each other, the series-connected transistors, i.e., the SST, the memory cell transistors MC1-MCm and the DST, being connected between the source line SL and the nth bit line BLn. The string ST shown in FIG. 2 is an example for describing a configuration of the memory block, and therefore, the number of the source select transistor SST, the memory cells MC1 to MCm, and the drain select transistor DST, which are included in a string ST, may be changed as a design choice according to the requirements of a memory device.

Dummy cells may be included at a position in the series-connected transistors, which is between the source select transistor SST, the memory cells MC1 to MCm, and the drain select transistor DST. The dummy cells are cells used to prevent electrical degradation of the string ST or improve an electrical characteristic of the string ST. The dummy cells do not store normal data but may store dummy data. The normal data may be stored in the memory cells MC1 to MCm.

The source select transistor SST may be configured to electrically connect the source line SL and a memory cell MC1 to each other or to electrically interrupt the connection between the source line SL and the memory cell MC1. Gates of source select transistors SST included in different strings ST may be connected to a source select line SSL. The memory cells MC1 to MCm may be configured to store normal data. Gates of memory cells MC1 to MCm included in different strings ST may be respectively connected to word lines WL1 to WLm. A group of memory cells connected to the same word line may constitute a page PG, and a program operation or a read operation may be performed in units of pages. The drain select transistor DST may be configured to electrically connect the bit lines BL1 to BLn and an mth memory cell MCm or to electrically interrupt the connection between bit lines BL1 to BLn and the mth memory cell MCm. Gates of drain select transistors DST included in different strings ST may be connected to a drain select line DSL.

In an erase operation, a turn-on voltage Von for turning on source select transistors SST and drain select transistors DST may be applied to the source select line SSL and the drain select line DSL. A pass voltage Vpass for turning on memory cells MC1 to MCm may be applied to the word lines WL1 to WLm. An erase voltage Vers may be applied to the source line SL.

In the erase operation, the bit lines BL1 to BLn may be floated (FLT), but the erase voltage Vers may be applied to the bit lines BL1 to BLn. The erase voltage Vers is higher than the pass voltage Vpass and the turn-on voltage Von. The turn-on voltage Von is higher than 0V. The pass voltage Vpass may be equal to or higher than the turn-on voltage Von, and is lower than the erase voltage Vers.

Figure 3:
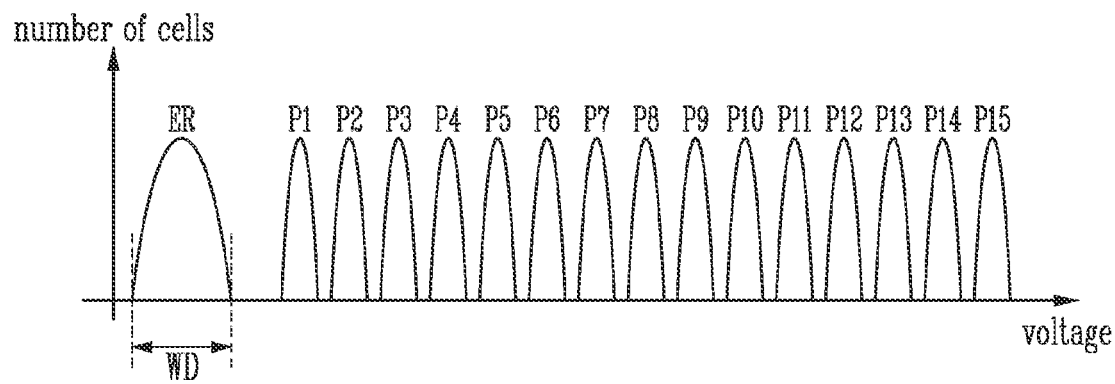
FIG. 3 is a diagram illustrating a threshold voltage distribution of memory cells.

FIG. 3 is a diagram illustrating a threshold voltage distribution of memory cells.

Referring to FIG. 3, memory cells may have various states according to a threshold voltage, and the threshold voltage may have different levels according to stored data. For example, the memory cells may store one-bit or two-or-more-bit data according to a program method. For example, a method in which one-bit data is stored in one memory cell is referred to as a single level cell method, and a method in which two-bit data is stored in one memory cells is referred to as a multi-level cell method. A method in which three-bit data is stored in one memory cell is referred to as a triple level cell method, and a method in which four-bit data is stored in one memory cell is referred to as a quad level cell method. In addition, five-or-more-bit data may be stored in one memory cell.

In FIG. 3, a threshold voltage distribution of memory cells in a quad or four-level cell method is illustrated as an example. However, this embodiment is not limited to the quad level cell method.

In the quad level cell method, the memory cells may have any one state among an erase state ER and first to fifteenth program states P1 to P15 according to a threshold voltage. A program operation means an operation of increasing a threshold voltage of memory cells having the erase state ER to a threshold voltage corresponding to any one of the first to fifteenth program states P1 to P15. An erase operation means an operation of decreasing a threshold voltage of memory cells corresponding to the first to fifteenth program states P1 to P15 to a threshold voltage corresponding to the erase state ER. Therefore, as a threshold voltage distribution width WD of the memory cells having the erase state ER becomes wider, the time required to increase the threshold voltage of the memory cells in the program operation may increase.

An erase operation capable of narrowing the threshold voltage distribution width WD corresponding to the erase state ER is described below.

Figure 4:
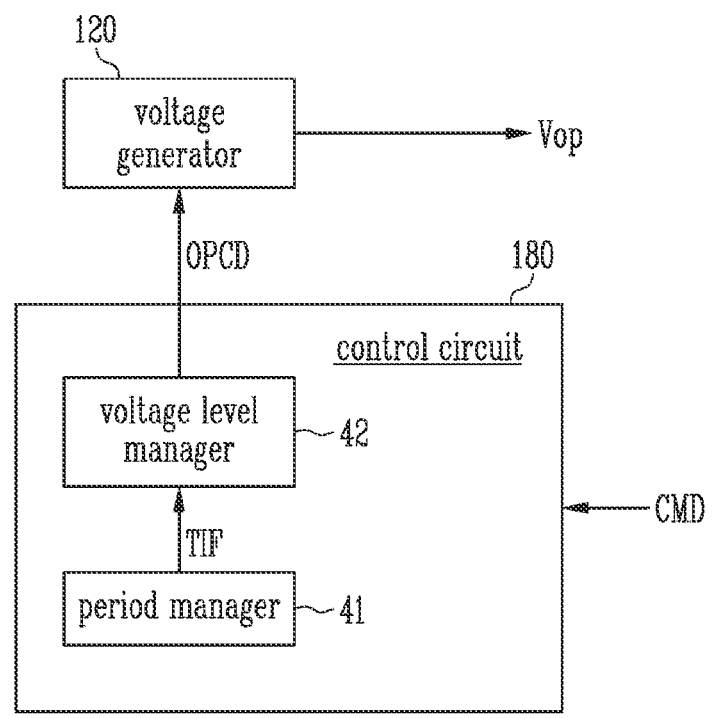
FIG. 4 is a diagram illustrating a control circuit in accordance with an embodiment of the present disclosure.

FIG. 4 is a diagram illustrating a control circuit in accordance with an embodiment of the present disclosure.

Referring to FIG. 4, the control circuit 180 may include a period manager 41 and a voltage level manager 42.

The period manager 41 may be configured to sequentially output time information TIF in response to a command CMD. For example, the period manager 41 may comprise a processor, not shown, which executes program, read and erase instructions. Those program, read and erase instructions cause the processor to perform or execute algorithms of control circuitry the outputs of which are required by the memory device 100 to program, read, and erase operations, and output time information TIF on periods of each operation according to an algorithm selected by the processor in response to the command CMD. An erase operation will be described as an example.

The erase operation may be performed in response to an erase command. The erase operation may be divided into an erase voltage rising period, an erase period, and a discharge period. The level of an erase voltage may be increased to a target level during an erase voltage rising period, by which data stored in memory cells may be erased during the erase period. A conductive line to which the erase voltage is applied may be subsequently discharged during a discharge period.

The erase period may be divided into a plurality of sub-periods. In the following description, the erase operation in which three sub-periods are included in the erase period is disclosed. The number of sub-periods may be changed, however, according to a memory device. The time information TIF may include or specify a start time of the erase voltage rising period, an erase period, the plurality of sub-periods, and the discharge period.

The voltage level manager 42 may be configured to change and output an operation code OPCD in response to the time information TIF. According to information on a start time of each period, which is included in the time information TIF, the voltage level manager 42 may change the operation code OPCD such that a voltage corresponding to the corresponding period is generated and output. That is, the operation code OPCD may include a code corresponding to a period and a code corresponding to a voltage level. For example, the voltage level manager 42 may allow a code corresponding to a sub-period and a code corresponding to a level of the erase voltage to be used in the sub-period to be included in the operation code OPCD. Therefore, whenever the period or the voltage level is changed, the voltage level manager 42 may output the operation code OPCD including a changed code.

The operation code OPCD output from the voltage level manager 42 may be transmitted to the voltage generator 120. The voltage generator 120 may be configured to output a voltage at a time corresponding to each period in response to the operation code OPCD. For example, in the erase operation, the voltage generator 120 may selectively output different-magnitude operating voltages Vop, including an erase voltage, a pass voltage, and a turn-on voltage at a time corresponding to each period in response to the operation code OPCD. Since the voltage generator 120 is connected to the row decoder (130 shown in FIG. 1) through the global lines, the operating voltages Vop output from the voltage generator 120 may be transferred to the row decoder (130 shown in FIG. 1) through the global lines.

Figure 5:
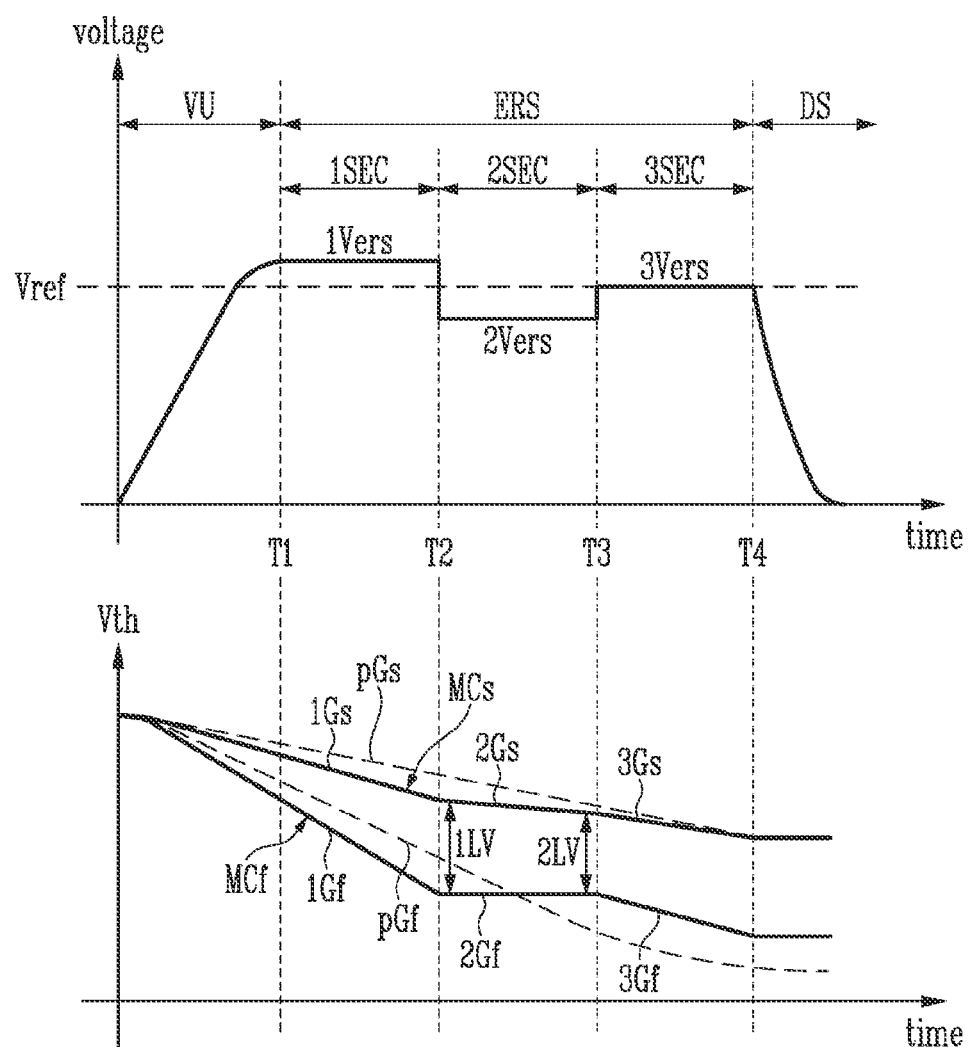
FIG. 5 is a diagram illustrating an erase operation in accordance with a first embodiment of the present disclosure.

FIG. 5 is a diagram illustrating erase operation voltage exemplar in accordance with a first embodiment of the present disclosure.

Referring to FIG. 5, the erase operation may include an erase voltage rising period VU, an erase period ERS, and a discharge period DS. The erase voltage rising period VU, the erase period ERS, and the discharge period DS may be temporally sequential. For example, when the erase voltage rising period VU is ended (T1), the erase period ERS is started. When the erase period ERS is ended, the discharge period DS is started.

In the erase voltage rising period VU, an erase voltage may be applied to a source line. The source line may be the source line SL shown in FIG. 2. It is assumed that the potential of the source line is 0V before the erase voltage rising period VU. When the erase voltage rising period VU is started, the magnitude of the voltage applied to the source line may be increased. The erase voltage may also be applied to bit lines. While the erase voltage is applied to the source line, a pass voltage may be applied to word lines of a selected memory block. While the potential of the source line is increased as the erase voltage is applied to the source line, the potential of the word lines may also be increased by the pass voltage. Since the potential of the source line is increased, a threshold voltage Vth of memory cells may be decreased. A threshold voltage of slow cells MCs among the memory cells may be decreased slower than a threshold voltage of fast cells MCf among the memory cells.

At a first time T1 at which the erase voltage applied to the source line is increased up to a first erase voltage 1Vers, the erase period ERS may be started. The first erase voltage 1Vers may be set to a level higher than a level of a reference voltage Vref. The reference voltage Vref may be set to a positive voltage level at which the memory cells can be erased. Since the first erase voltage 1Vers is higher than the reference voltage Vref, the time required to erase the memory cells by using the first erase voltage 1Vers may be less than the time required to erase the same memory cells by the reference voltage Vref. That is, the fast or quickly-erased cells MCf may be erased faster, i.e., in less time, than the slow cells MCs.

The erase period ERS may be divided into first to third sub-periods 1SEC to 3SEC.

The first sub-period 1SEC may be set between the first time T1 and a second time T2, the second sub-period 2SEC may be set between the second time T2 and a third time T3, and the third sub-period 3SEC may be set between the third time T3 and a fourth time T4.

In the first sub-period 1SEC, the first erase voltage 1Vers higher than the reference voltage Vref may be used such that the erase operation of the memory cells can be performed fast. In the second sub-period 2SEC, a second erase voltage 2Vers lower than the reference voltage Vref may be used to decrease a threshold voltage difference between the slow cells MCs and the fast cells MCf. In the third sub-period 3SEC, a third erase voltage 3Vers equal to the reference voltage Vref such that the erase operation can be performed while maintaining the threshold voltage difference between the slow cells MCs and the fast cells MCf. The erase operation performed in the first to third sub-periods 1SEC to 3SEC will be described in detail as follows.

Since the first sub-period 1SEC is a period in which the erase operation of the memory cells is performed relatively fast, the first erase voltage 1Vers higher than the reference voltage Vref may be constantly applied to the source line. Therefore, between the first time T1 at which the erase operation is started and the second time T2 at which the first sub-period 1SEC is ended, slopes 1Gs and 1Gf of the memory cells MCs and MCf, which are decreased by the first erase voltage 1Vers, may become larger than slopes pGs and pGf of the threshold voltage Vth of memory cells, which are decreased by the reference voltage Vref.

A slope means a value obtained by a variation of the threshold voltage Vth by a variation of time. Therefore, that the slope is large means that the threshold voltage Vth is decreased relatively fast for the same time, and that the slope is small means that the threshold voltage Vth is decreased relatively slow for the same time. When the erase operation is performed fast, a threshold voltage Vth of the fast cells MCf is decreased faster than a threshold voltage Vth of the slow cells MCs, and therefore, the threshold voltage difference between the slow cells MCs and the fast cells MCf may increase until before the second time T2.

Since the second sub-period 2SEC is a period in which the threshold voltage difference between the slow cells MCs and the fast cells MCf is decreased, a second erase voltage 2Vers less than the reference voltage Vref may be constantly applied to the source line during the sub-period 2SEC. The second erase voltage 2Vers may be set to a voltage lower than, i.e., less than, the reference voltage Vref and yet higher than 0V. When the first erase voltage 1Vers applied to the source line is decreased to the second erase voltage 2Vers, variations of the threshold voltages Vth of the slow cells MCs and the fast cells MCf may decrease. The variation of the threshold voltage Vth of the fast cells MCf may be greater than the variation of the threshold voltage Vth of the slow cells MCs. Since the variation of the threshold voltage Vth of the slow cells MCs is less than the variation of the threshold voltage Vth of the fast cells MCf before the second time T2, an erase voltage change between the second time T2 and the third time T3 may have less influence on the slow cells MCs than the fast cells MCf.

Since the threshold voltage Vth of the fast cells MCf decreases faster than the erase voltage is decreased until time T2, the erase voltage change between the second time T2 and the third time T3 may have more influence on the fast cells MCf than the slow cells MCs. Therefore, in the second sub-period 2SEC, the slope 2Gf of a threshold voltage variation of the fast cells MCf may less than the slope 2Gs of a threshold voltage variation of the slow cells MCs.

That is, in the second sub-period 2SEC, the variation of the threshold voltage Vth of the slow cells MCs is larger than the variation of the threshold voltage Vth of the fast cells MCf. Therefore, when assuming that a threshold voltage difference between the fast cells MCf and the slow cells MCs at the second time T2 at which the second sub-period 2SEC is started is a first level 1LV, a threshold voltage difference between the fast cells MCf and the slow cells MCs at the third time T3 at which the second sub-period 2SEC is ended may be a second level 2LV lower than the first level 1LV.

Since the third sub-period 3SEC is a period in which the erase operation is performed while maintaining the threshold voltage difference between the fast cells MCf and the slow cells MCs, the third erase voltage 3Vers higher than the second erase voltage 2Vers may be constantly applied to the source line. In order to erase the memory cells while suppressing the threshold voltage difference between the fast cells MCf and the slow cells MCs from increasing in the third sub-period 3SEC, the third erase voltage 3Vers may be set to a voltage which is higher than the second erase voltage 2Vers and is lower than the first erase voltage 1Vers. For example, the third erase voltage 3Vers may be set to have the same level as the reference voltage Vref. Thus, a slope 3Gs of the threshold voltage Vth of the slow cells MCs and a slope 3Gf of the threshold voltage Vth of the fast cells MCf become larger than the slopes 2Gs and 2Gf in the second sub-period 2SEC, and are maintained similar to each other.

After the fourth time T4 at which the third sub-period 3SEC has ended, a discharge operation for decreasing the potential of the source line is performed. In the discharge period DS in which the discharge operation is performed, the word lines, the source line, the select lines, and the bit lines may be discharged, preferably to a reference voltage such as ground or zero volts.

Figure 6A:
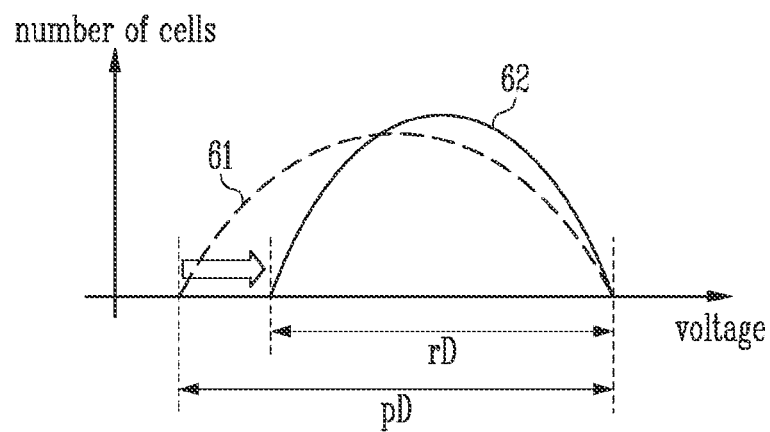
FIGS. 6A and 6B are diagrams illustrating a threshold voltage of memory cells in accordance with the first embodiment of the present disclosure.
Figure 6B:
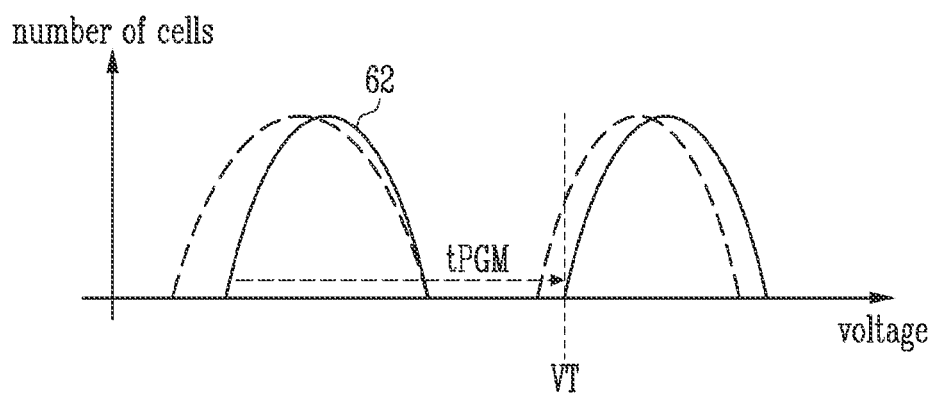

FIGS. 6A and 6B are diagrams illustrating a threshold voltage of memory cells in accordance with the first embodiment of the present disclosure.

Referring to FIGS. 6A and 5, when only the reference voltage Vref is applied to the source line during the erase period ERS, a distribution width pD of a threshold voltage 61 of the memory cells may be widened due to deep erasing of the fast cells MCf. However, as with the first embodiment voltages depicted in FIG. 5, the first erase voltage 1Vers (in FIG. 5) is higher than the reference voltage Vref. The second erase voltage 2Vers (in FIG. 5) is lower than the reference voltage Vref. The magnitude of the third erase voltage 3Vers (in FIG. 5) is between the magnitudes of 1Vers and 2Vrs and equal to the reference voltage Vref magnitude, and the first erase voltage 1Vers, the second erase voltage 2Vers and the third erase voltage 3Vers are sequentially applied to the source line in different sub-periods, so that deep erasing of the fast cells MCf can be prevented. Thus, the threshold voltage of the fast cells MCf can be increased, and accordingly, a distribution width rD of a threshold voltage 62 of the memory cells can be decreased or narrowed.

Referring to FIG. 6B, when the distribution width of the threshold voltage 62 of erased memory cells is narrowed, a time tPGM required to increase the threshold voltage of the fast cells to a target voltage VT in a program operation can be shortened, and accordingly, the time required to perform a program operation can be shortened.

Figure 7:
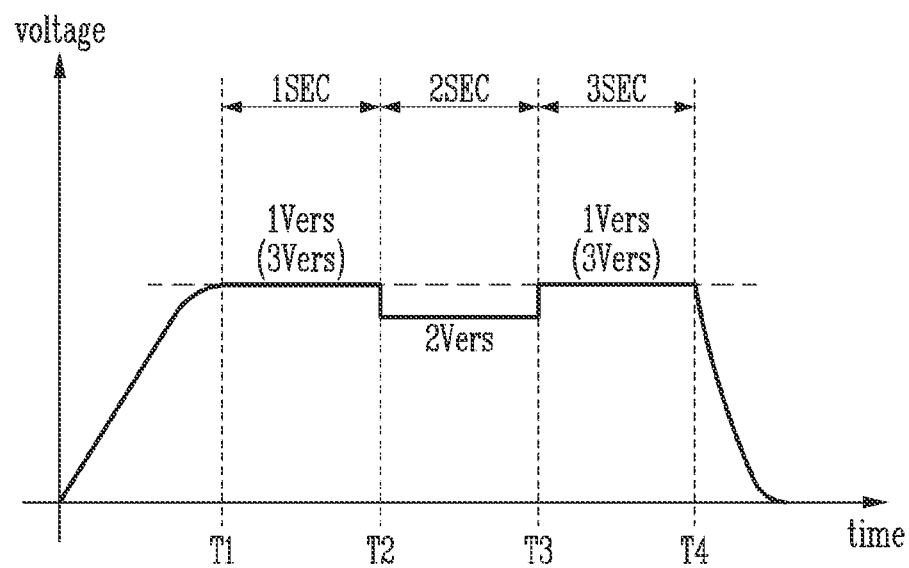
FIG. 7 is a diagram illustrating an erase operation in accordance with a second embodiment of the present disclosure.

FIG. 7 is a diagram illustrating an erase operation in accordance with a second embodiment of the present disclosure.

Referring to FIGS. 7 and 5, the same erase voltage may be applied to the source line in first and third sub-periods 1SEC and 3SEC, and a second erase voltage 2Vers may be applied to the source line in a second sub-period 2SEC. In the second embodiment, descriptions of portions overlapping with those of the first embodiment will be omitted. A first erase voltage 1Vers or a third erase voltage 3Vers may be applied to the source line in the first and third sub-periods 1SEC and 3SEC. The first to third erase voltages 1Vers to 3Vers used in the second embodiment may be respectively equal to the first to third erase voltages 1Vers to 3Vers used in the first embodiment.

When the first erase voltage 1Vers is used in the first and third sub-periods 1SEC and 3SEC, the first erase voltage 1Vers among the first to third erase voltages 1Vers to 3Vers is highest, and hence a time required in the third sub-period 3SEC may be shortened as compared with the first embodiment. For example, the third sub-period 3SEC may be performed from a third time T3 to a fourth time T4. The fourth time T4 of the second embodiment may be shorter than the fourth time T4 of the first embodiment.

When the third erase voltage 3Vers is used in the first and third sub-periods 1SEC and 3SEC, the third erase voltage 3Vers is lower than the first erase voltage 1Vers, and hence a time required in the first sub-period 1SEC may increase as compared with the first embodiment. For example, the first sub-period 1SEC may be performed from a first time T1 to a second time T2. The second time T2 of the second embodiment may become longer than the second time (T2 shown in FIG. 5) of the first embodiment. However, since the second erase voltage 2Vers lower than the first and third erase voltages 1Vers and 3Vers is applied to the source line in the second sub-period 2SEC, the threshold voltage distribution width of erased memory cells may be narrowed.

Figure 8:
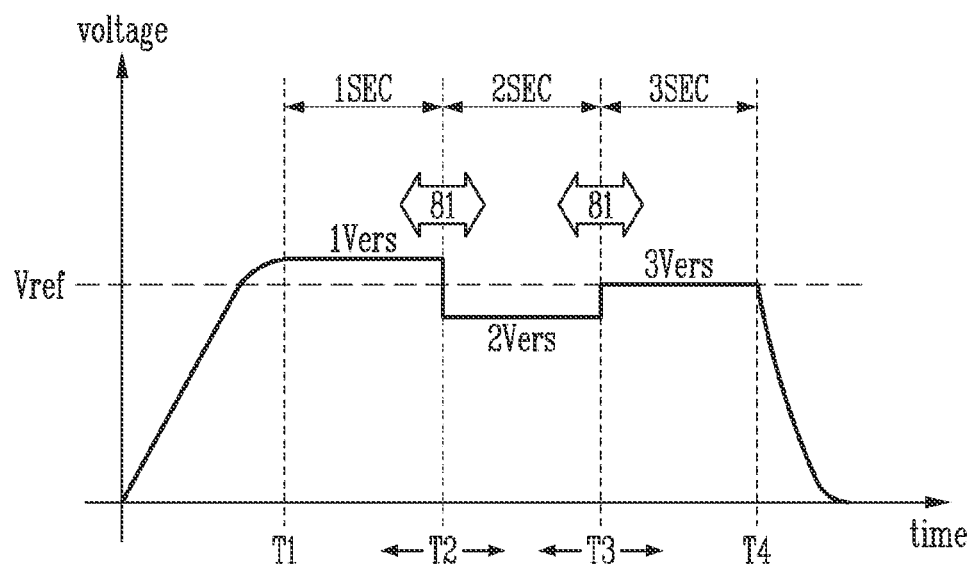
FIG. 8 is a diagram illustrating an erase operation in accordance with a third embodiment of the present disclosure.

FIG. 8 is a diagram illustrating an erase operation in accordance with a third embodiment of the present disclosure.

Referring to FIGS. 8 and 5, in the third embodiment, a second time T2 or a third time T3 may vary (81), and first to third erase voltages 1Vers to 3Vers applied to the source line in first to third sub-periods 1SEC to 3SEC may be equal to the first to third erase voltages 1Vers to 3Vers described in the first embodiment. In the third embodiment, an electrical characteristic of the memory cells may vary according to a memory device, and therefore, times set in the first to third sub-periods 1SEC to 3SEC may be changed according to an electrical characteristic of memory cells included in a memory device. The second time T2 or the third time T3 may be set according to a number of fast cells MCf. For example, in a memory device in which the number of fast cells MCf is relatively small, a threshold voltage difference between fast cells MCf and slow cells MCs may be relatively small, and therefore, the second or third time T2 or T3 may be adjusted such that a time required in the second sub-period 2SEC for decreasing the threshold voltage difference is shortened. On the contrary, in a memory device in which the number of fast cells MCf is relatively large, a threshold voltage difference between fast cells MCf and slow cells MCs may be relatively large, and therefore, the second or third time T2 or T3 may be adjusted such that a time required in the second sub-period 2SEC for decreasing the threshold voltage difference is increased.

Figure 9:
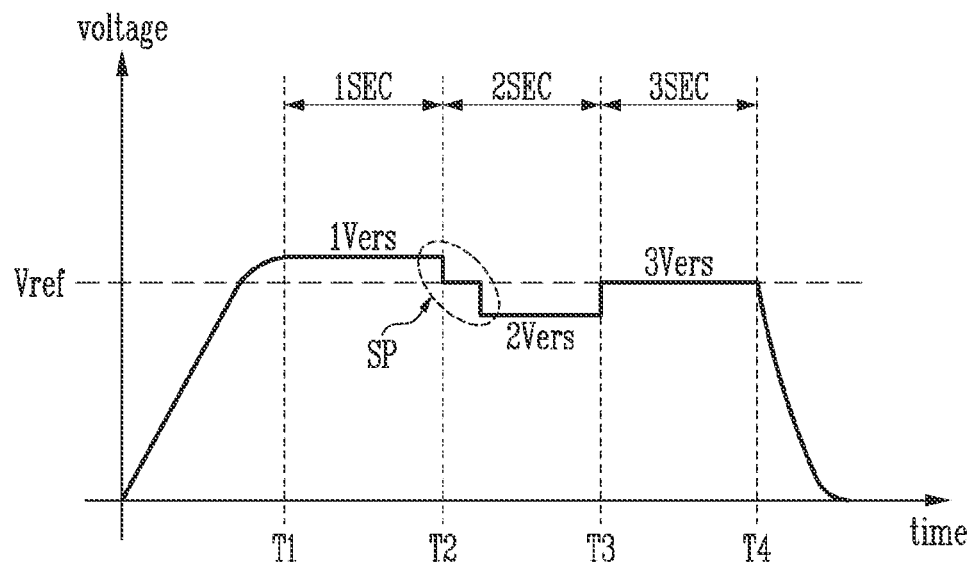
FIG. 9 is a diagram illustrating an erase operation in accordance with a fourth embodiment of the present disclosure.

FIG. 9 is a diagram illustrating an erase operation in accordance with a fourth embodiment of the present disclosure.

Referring to FIG. 9, in the fourth embodiment, when a second sub-period 2SEC is started, a first erase voltage 1Vers applied to the source line may be incrementally "stepped down" from or decreased from 1Vers to a second erase voltage 2Vers (SP). The erase operation may thus be performed in the same manner as the first embodiment until a second time T2 after the erase operation is started. Descriptions of operations that are the same or which "overlap" are omitted in the interest of brevity.

At the second time T2 at which the second sub-period 2SEC is started, the first erase voltage 1Vers applied to the source line may be incrementally stepped down or decreased to the reference voltage Vref. The reference voltage Vref may also be decreased to the second erase voltage 2Vers. A time period during which the first erase voltage 1Vers is decreased in one step to the reference voltage Vref is illustrated in FIG. 9. However, the first erase voltage 1Vers may actually be decreased by two or more additional steps. The erase operation may thereafter be performed in the same manner as the first embodiment from after a third time T3.

Figure 10:
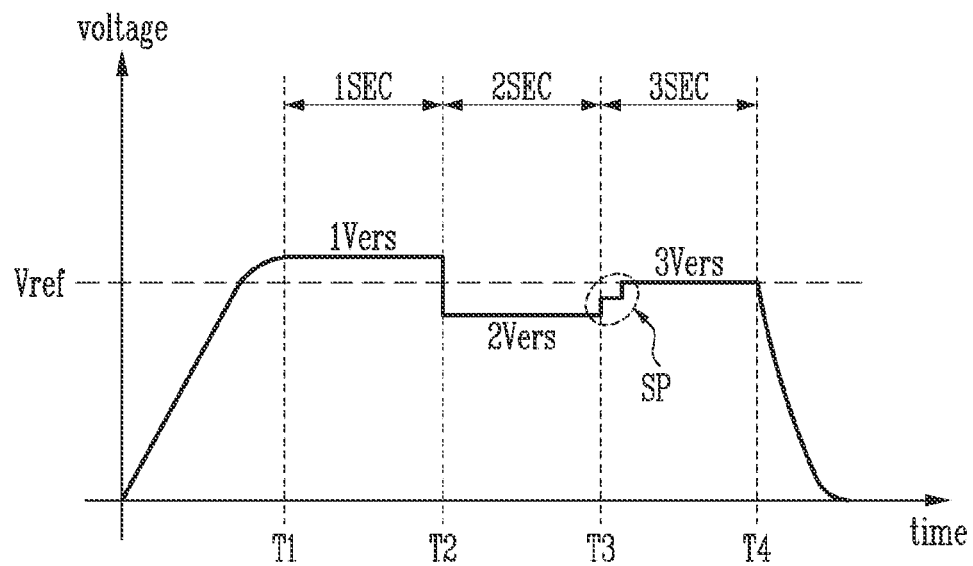
FIG. 10 is a diagram illustrating an erase operation in accordance with a fifth embodiment of the present disclosure.

FIG. 10 is a diagram illustrating an erase operation in accordance with a fifth embodiment of the present disclosure.

Referring to FIG. 10, in the fifth embodiment, when a third sub-period 3SEC is started, a second erase voltage 2Vers applied to the source line may be "stepped up" or incrementally increased up to a third erase voltage 3Vers (SP). The erase operation may thus be the same between T0 and T3 in the same manner as the first embodiment and in the same manner as the first embodiment after the second erase voltage 2Vers is stepped up to 3Vers starting at T3.

As FIG. 10 shows, at time T3, the second erase voltage 2Vers applied to the source line may be increased in steps until the third erase voltage 3Vers is achieved. At T4, the 3Vers voltage may be decreased to zero or any other reference potential. Those of ordinary skill should recognize that 2Vers may be increased to 3Vers in one step as well as two or more steps.

Figure 11:
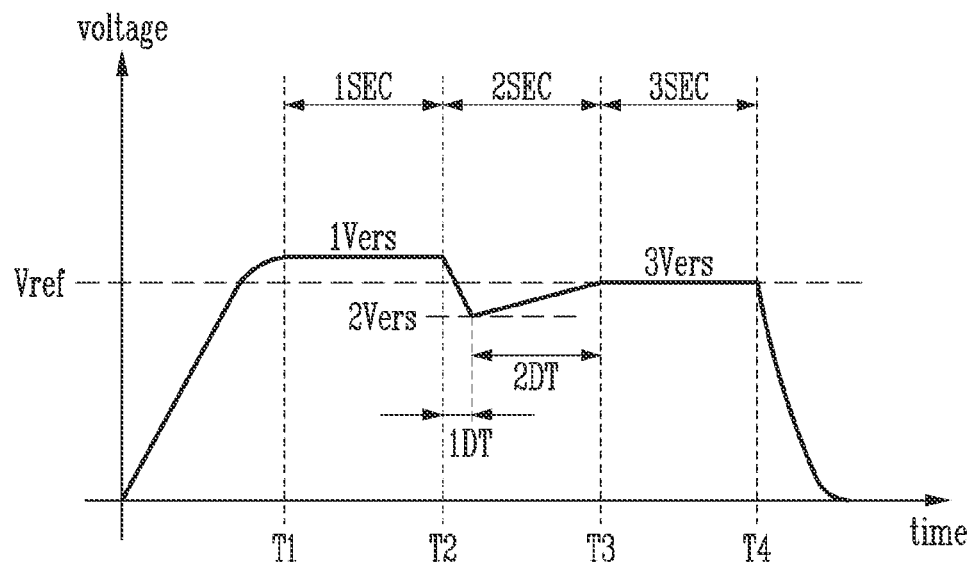
FIG. 11 is a diagram illustrating an erase operation in accordance with a sixth embodiment of the present disclosure.

FIG. 11 is a diagram illustrating an erase operation in accordance with a sixth embodiment of the present disclosure.

Referring to FIG. 11, in the sixth embodiment, a second erase voltage 2Vers is not maintained for a certain time but may be gradually increased up to a third erase voltage 3Vers in a second sub-period 2SEC. The erase operation may be performed in the same manner as the first embodiment until a second time T2 after the erase operation is started, and therefore, descriptions of portions overlapping with those of the first embodiment will be omitted.

At the second time T2 at which the second sub-period 2SEC is started, a first erase voltage 1Vers applied to the source line may be gradually (and in the sixth embodiment substantially linearly) decreased to the second erase voltage 2Vers. When the potential of the source line is decreased down to the second erase voltage 2Vers, the potential of the source line may then be gradually increased (and in the sixth embodiment substantially linearly) up to the third erase voltage 3Vers without any measurable time during which the second erase voltage 2Vers is maintained. The voltage generator (120 shown in FIG. 1) may control a voltage such that the second erase voltage 2Vers is not rapidly increased to the third erase voltage 3Vers but gradually increased. For example, when assuming that a time required for the first erase voltage 1Vers to be decreased down to the second erase voltage 2Vers is a first variable time 1DT, a second variable time 2DT required for the second erase voltage 2Vers to be increased up to the third erase voltage 3Vers may be longer than the first variable time 1DT. The erase operation may be performed in the same manner as the first embodiment from after a third time T3.

Figure 12:
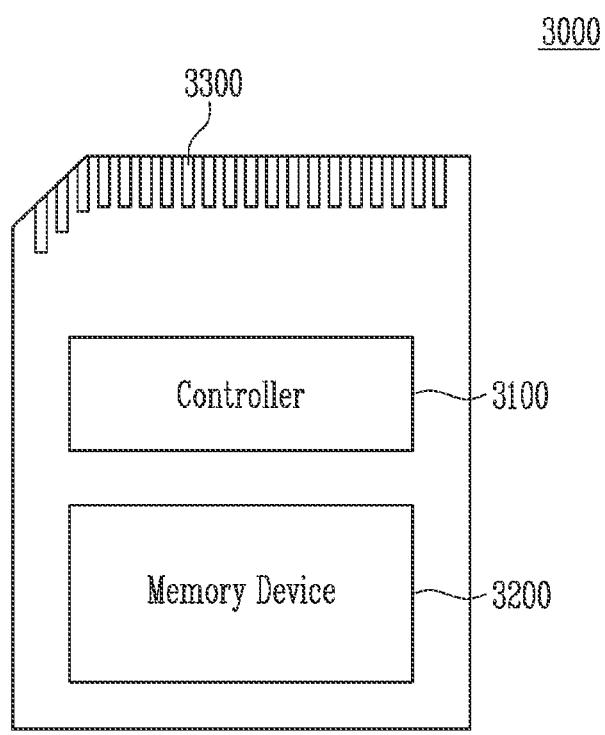
FIG. 12 is a diagram illustrating a memory card system to which the memory device of the present disclosure is applied.

FIG. 12 is a diagram illustrating a memory card system to which the memory device of the present disclosure is applied.

Referring to FIG. 12, a memory card system 3000 includes a controller 3100, a memory device 3200, and a connector 3300.

The controller 3100 may be connected to the memory device 3200. The controller 3100 may access the memory device 3200. For example, the controller 3100 may control a program, read or ease operation, or control a background operation of the memory device 3200. The controller 3100 may provide an interface between the memory device 3200 and a host. The controller 3100 may drive firmware for controlling the memory device 3200. For example, the controller 3100 may include components such as a Random Access Memory (RAM), a processing unit, a host interface, a memory interface, and the error corrector.

The controller 3100 may communicate with an external device through the connector 3300. The controller 3100 may communicate with the external device (e.g., the host) according to a specific communication protocol. Exemplarily, the controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 3300 may be defined by at least one of the above-described various communication protocols.

The memory device 3200 may include memory cells, and be configured identically to the memory device 100 shown in FIG. 1. Therefore, the memory device 3200 may control a soft program operation for increasing a threshold voltage of dummy cells.

The controller 3100 and the memory device 3200 may be integrated into a single semiconductor device, to constitute a memory card. For example, the controller 3100 and the memory device 3200 may constitute a memory card such as a personal computer (PC) card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 13:
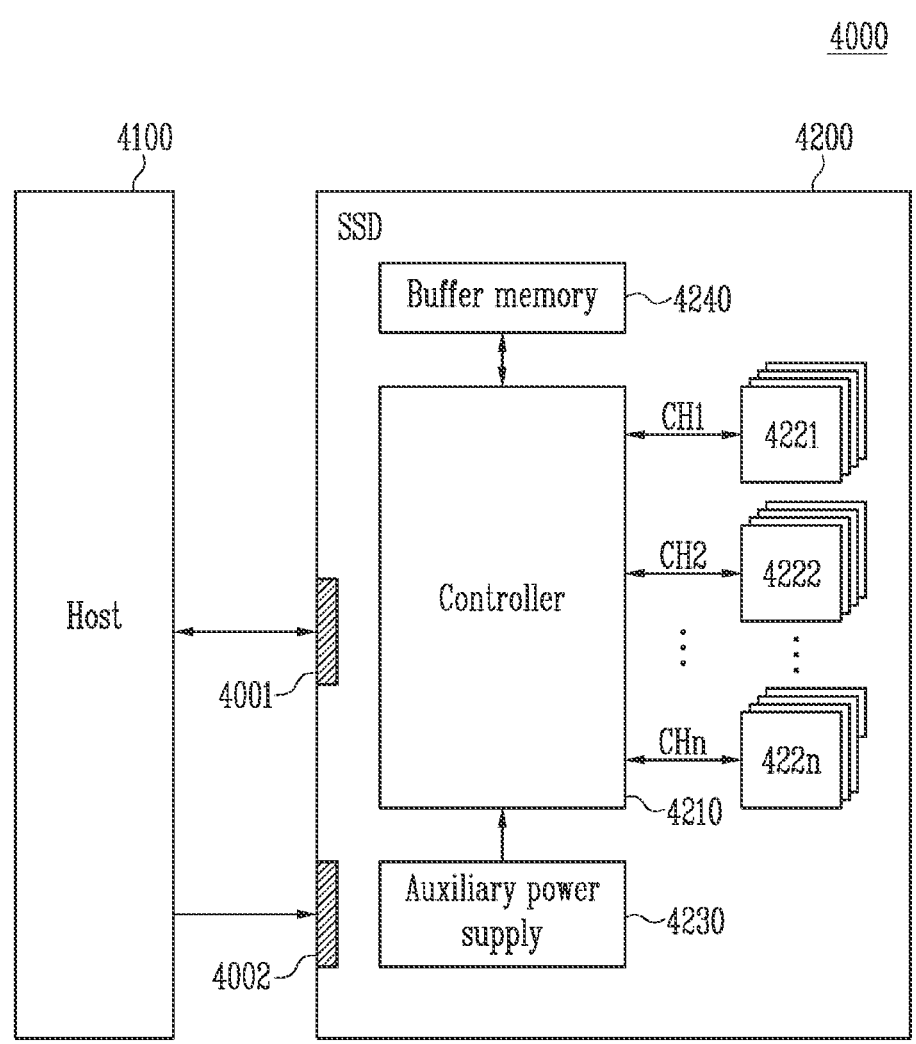
FIG. 13 is a diagram illustrating a Solid State Drive (SSD) system to which the memory device of the present disclosure is applied.

FIG. 13 is a diagram illustrating a Solid State Drive (SSD) system to which the memory device of the present disclosure is applied.

Referring to FIG. 13, the SSD system 4000 includes a host 4100 and an SSD 4200. The SSD 4200 exchanges a signal with the host 4100 through a signal connector 4001, and receives power through a power connector 4002. The SSD 4200 includes a controller 4210, a plurality of memory devices 4221 to 422*n*, an auxiliary power supply 4230, and a buffer memory 4240.

The controller 4210 may control the plurality of memory devices 4221 to 422*n* in response to a signal received from the host 4100. Exemplarily, the signal may be a signal based on an interface between the host 4100 and the SSD 4200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The plurality of memory devices 4221 to 422*n* may include a plurality of memory cells configured to store data. Each of the plurality of memory devices 4221 to 422*n* may be configured identically to the memory device 100 shown in FIG. 1. Therefore, each of the plurality of memory devices 4221 to 422*n* may control a soft program operation for increasing a threshold voltage of dummy cells. The plurality of memory devices 4221 to 422*n* may communicate with the controller 4210 through channels CH1 to CHn.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. Exemplarily, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of memory devices 4221 to 422*n*, or temporarily store meta data (e.g., a mapping table) of the memory devices 4221 to 422*n*. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In accordance with the present disclosure, a threshold voltage of memory cells can be prevented from being excessively decreased in an erase operation, and a threshold voltage distribution width of memory cells in an erase state is narrowed, so that the time required to subsequently perform a program operation can be shortened.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A method of operating a memory device, the method comprising:
    applying a first erase voltage to a source line in an erase operation of a memory block, the memory block being connected between the source line and bit lines, the first erase voltage having a first magnitude and applied to the source line for a first period of time;
    at the conclusion of the first period of time, applying a second erase voltage to the source line, the second erase voltage having a second magnitude less than the first magnitude and applied to the source line for a second period of time;
    at the conclusion of the second period of time, applying a third erase voltage to the source line, for a third period of time.

2. The method of claim 1, wherein the third erase voltage has a third magnitude, and the third magnitude is higher than the second magnitude but lower than the first magnitude.

3. The method of claim 1, wherein the third erase voltage is substantially equal to the first erase voltage.

4. The method of claim 1, wherein, after the first erase voltage is applied to the source line, the first erase voltage is maintained substantially constant for a first amount of time.

5. The method of claim 1, wherein, after the second erase voltage is applied to the source line, the second erase voltage is maintained substantially constant for a second amount of time.

6. The method of claim 1, wherein, after the second erase voltage is applied to the source line, the second erase voltage is gradually increased to the third erase voltage.

7. The method of claim 6, wherein a time period over which the second erase voltage is gradually increased to the third erase voltage is longer than a time period during which the first erase voltage is gradually decreased to the second erase voltage.

8. The method of claim 1, wherein, when at least one of: the first erase voltage, the second erase voltage, and the third erase voltage is applied to the source line,
    the bit lines are floated, and
    select transistors between the source line and the bit lines are turned on, and
    memory cells between the select transistors are turned on.

9. The method of claim 8, wherein a turn-on voltage is applied to select lines connected to gates of the select transistors, and
    a pass voltage is applied to word lines connected to gates of the memory cells.

10. The method of claim 9, wherein the turn-on voltage is a positive voltage having a magnitude greater than zero volts; and
    wherein the pass voltage is substantially the same as the turn-on voltage.

11. The method of claim 9, wherein the turn-on voltage is a positive voltage having a magnitude greater than 0V, and
    wherein the pass voltage has a magnitude greater than the turn-on voltage and less than each of the first, second and third erase voltages.

12. A method of operating a memory device, the method comprising:
    during a first time period, decreasing threshold voltages of slow cells and fast cells, which are included in a selected memory block;
    during a second time period, which starts at the conclusion of the first time period, reducing a threshold voltage difference between the slow cells and the fast cells after the first phase; and
    during a third time period, which starts at the conclusion of the second time period, decreasing the threshold voltages of the slow cells and the fast cells after the second time period.

13. The method of claim 12, wherein, during the first time period, a first erase voltage having a positive voltage level is applied to a source line or bit lines, connected to the selected memory block.

14. The method of claim 13, wherein, during the second time period, a second erase voltage having a positive voltage level lower than the positive voltage level of the first erase voltage is applied to the source line or the bit lines, connected to the selected memory block.

15. The method of claim 14, wherein, during the third time period, a third erase voltage higher than the second erase voltage is applied to the source line or the bit lines, connected to the selected memory block.

16. The method of claim 15, wherein the third erase voltage is at least one of: a) substantially equal to the first erase voltage; and b) less than the first erase voltage.

17. A memory device comprising:
    a period manager configured to sequentially output time information on: a) an erase voltage rising period, b) an erase period comprising a plurality of sub-periods, and c) a discharge period, all in response to an erase command;
    a voltage level manager configured to output an operation code in response to the time information; and
    a voltage generator configured to sequentially output erase voltages having different levels in response to the operation code,
    wherein, in an erase operation, the voltage generator is configured to sequentially output a first erase voltage, output a second erase voltage lower than the first erase voltage, and output a third erase voltage higher than the second erase voltage, all of them being output in response to the operation code.

18. The memory device of claim 17, wherein the period manager comprises a processor, which executes program codes, corresponding to program, read, and erase operations, and wherein the period manager is configured to output the time information according to an algorithm selected in response to a command among the algorithms.

19. The memory device of claim 17, wherein the voltage level manager is configured to generate and output a code corresponding to the erase voltage rising period, the erase period including the plurality of sub-periods, or the discharge period, which is included in the time information, and the operation code including a code corresponding to a voltage level.

20. The memory device of claim 17, wherein the voltage generator is configured to sequentially output the erase voltage having the different levels to a global line corresponding to a source line of a memory block.

* * * * *